(No Model.)
S. C. SCHOFIELD.
STOVE PIPE DAMPER.
No. 403,489. Patented May 14, 1889.
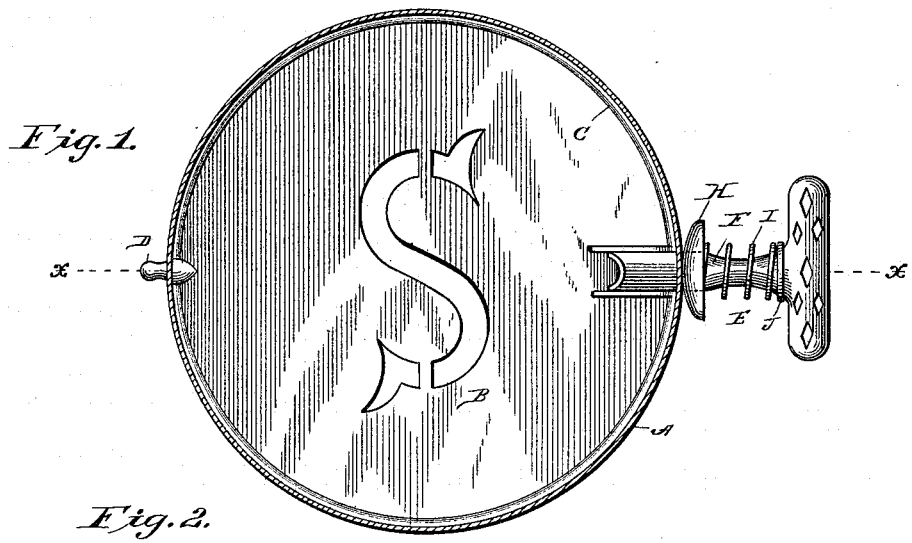
Fig. 1.
Fig. 2.
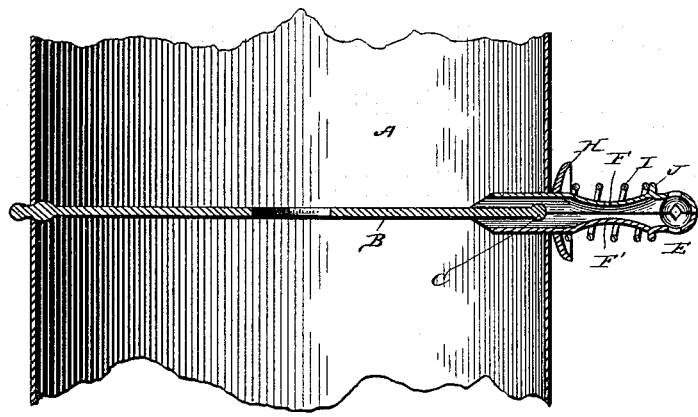
Fig. 3.
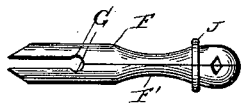
Witnesses.
Inventor.

UNITED STATES PATENT OFFICE.

SILAS C. SCHOFIELD, OF FREEPORT, ILLINOIS, ASSIGNOR TO FREDERIC BARTLETT, OF SAME PLACE.

STOVE-PIPE DAMPER.

SPECIFICATION forming part of Letters Patent No. 403,489, dated May 14, 1889.

Application filed February 1, 1889. Serial No. 298,390. (No model.)

*To all whom it may concern:*

Be it known that I, SILAS C. SCHOFIELD, a resident of Freeport, in the county of Stephenson and State of Illinois, have invented certain new and useful Improvements in Stove-Pipe Dampers; and I do hereby declare the following to be a full, clear, and exact description of the invention, such as will enable others skilled in the art to which it pertains to make and use the same.

This invention relates to dampers provided with separable handles adapted to be reattached when the damper has been placed in position in the pipe. It is fully described and claimed in this specification, and shown in the accompanying drawings, in which—

Figure 1 is a top view of the damper in position in the pipe. Fig. 2 is a vertical section on the line $x\ x$, Fig. 1. Fig. 3 is a side view of the handle detached from all other parts.

In the drawings, A is an ordinary stovepipe, and B a damper fitting loosely within it and provided with the usual central openings to prevent entire closure of the pipe at any time. This damper is preferably a thin circular plate provided with a marginal bead, C, and having all its parts in substantially the same plane. Upon one side the plate is provided with a short gudgeon, D, to pass outward through a suitable opening in the wall of the pipe. A handle, E, thrust through the wall at a point diametrically opposite to the gudgeon D, engages the side of the damper and forms with the gudgeon D an axis upon which the damper may revolve. The handle is rounded, hollow, and formed of two similar parts, F F', each provided with a transverse groove, G, adapted to fit over the bead upon the edge of the damper. From this groove inward each of the parts F is cut away, so so that when the proper faces of the external parts of the handle meet and register the corresponding internal faces are at a distance from each other equal to the thickness of the damper itself. From this it follows that the two halves of the handle may embrace the side of the damper, closely fitting its bead and extending out for a short distance upon both surfaces. Without the pipe a loose collar, H, is placed upon the handle, and against this presses a coiled spring, I, whose opposite end reacts against a shoulder, J, formed integrally with the parts of the handle. Between the collar and shoulder the handle is externally diminished. Now, when the collar which fits closely about the handle when near the pipe is drawn back over this diminished part the inner ends of the parts of the handle may be readily separated far enough to allow the grooves to release the bead, and the handle itself may be withdrawn from the pipe, leaving the damper free upon one side, which is quite sufficient to permit its removal.

In inserting the damper, the operation is similar and need not be described in detail further than to remark that when the collar is released the spring forces it up to the pipe and thus clamps the parts of the handle upon the damper, and at the same time by the friction produced holds the damper at any desired angle. Lateral movement of the damper with respect to its axis is prevented by slight integrally-formed ribs K, between which one of the halves of the handle fits closely when in place.

Without the pipe the handle is provided with apertures for the admission of air, and within the pipe the internal cavity of the handle communicates with the air and gases passing upward therein, and, as when the stove is in use the internal temperature is higher than the external, a constant inward draft of cold air through the handle is caused and thereby the handle is kept cooler than in dampers of ordinary construction.

It is evident that by extending the marginal bead entirely around the damper the latter is given sufficient strength while making the body of the plate thinner than it could otherwise be; but for the main purposes of this invention it is immaterial whether or not it be carried beyond the limits of the portion of the handle inclosing it.

What I claim as new, and desire to secure by Letters Patent, is—

1. The combination, with a damper, of a hollow handle having in both the part normally without and the part normally within the pipe-openings communicating with the interior of the handle, for the purpose set forth.

2. The combination, with a damper having at one side a bead or lug raised above the plane of its surface, of a split handle adapted to clasp the side of the damper and provided upon one of the clasping-surfaces with a recess adapted to receive said bead, substantially as set forth.

3. The combination, with a damper, of a split handle clasping the edge or side of the damper and a sliding collar placed upon said handle and adapted to prevent the separation of its parts, substantially as set forth.

4. The combination of the damper having the bead and the ribs raised above its surface, the divided and grooved handle clasping the side of the damper between said lugs and over said bead, the collar sliding upon the handle, and a spring coiled about the handle and pressing the collar toward the damper, substantially as and for the purpose set forth.

In testimony whereof I have signed this specification in the presence of two subscribing witnesses.

SILAS C. SCHOFIELD.

Witnesses:
J. H. STEARNS,
JAMES I. NEFF.